(12) United States Patent
Geide

(10) Patent No.: US 8,713,674 B1
(45) Date of Patent: Apr. 29, 2014

(54) SYSTEMS AND METHODS FOR EXCLUDING UNDESIRABLE NETWORK TRANSACTIONS

(75) Inventor: Michael Geide, Herndon, VA (US)

(73) Assignee: Zscaler, Inc., San Jose, CA (US)

( * ) Notice: Subject to any disclaimer, the term of this patent is extended or adjusted under 35 U.S.C. 154(b) by 709 days.

(21) Appl. No.: 12/971,413

(22) Filed: Dec. 17, 2010

(51) Int. Cl.
*G06F 11/00* (2006.01)

(52) U.S. Cl.
USPC ............... 726/22; 726/23; 726/24; 726/25

(58) Field of Classification Search
USPC ...................................... 726/22–25
See application file for complete search history.

(56) References Cited

U.S. PATENT DOCUMENTS

| | | | |
|---|---|---|---|
| 7,899,849 B2 * | 3/2011 | Chaudhry et al. | 707/821 |
| 8,185,930 B2 * | 5/2012 | Alperovitch et al. | 726/1 |
| 8,301,904 B1 * | 10/2012 | Gryaznov | 713/188 |
| 8,397,293 B2 * | 3/2013 | Aupperle et al. | 726/22 |
| 2008/0127338 A1 * | 5/2008 | Cho et al. | 726/22 |
| 2008/0244744 A1 * | 10/2008 | Thomas et al. | 726/23 |
| 2010/0011432 A1 * | 1/2010 | Edery et al. | 726/11 |
| 2011/0162069 A1 * | 6/2011 | Aupperle et al. | 726/22 |
| 2013/0086636 A1 * | 4/2013 | Golovanov | 726/3 |

* cited by examiner

*Primary Examiner* — Krisna Lim

(74) *Attorney, Agent, or Firm* — Clements Bernard PLLC; Lawrence A. Baratta, Jr.; Christopher L. Bernard

(57) ABSTRACT

Cloud based security is the common core of any cloud based service offering and includes in-line inspection of transaction for its customers, meaning that transactions are analyzed in real-time and a decision is made on the spot whether to allow or block the transaction based on a variety of criteria. In depth content analysis for illicit activities does not scale well to in-line transaction review. The present application discloses systems, methods and computer programs to conduct content analysis based upon a fixed time periods worth of in-line transactions, where the results of the content analysis can identify malicious sites and incorporate the identified sites into subsequent in-transaction review.

13 Claims, 2 Drawing Sheets

SYSTEMS AND METHODS FOR EXCLUDING UNDESIRABLE NETWORK TRANSACTIONS

I. BACKGROUND

The present invention relates to computerized systems, software and methods for excluding undesirable network transactions. Cloud based security (for example Zscaler® Security Cloud) is an emerging framework to deploy and upgrade security solutions for multiple service subscribers without causing the upgrade delay found in conventional premise security appliances and applications. Cloud based security is the common core of any cloud based service offering and includes in-line inspection of transaction for its customers, meaning that transactions are analyzed in real-time and a decision is made on the spot, whether to allow or block the transaction based on a variety of criteria. Security services such as URL and content-based message filtering, malware scanning, data leakage protection, may be used for this purpose. Additional specific services may be offered through appropriate configuration and monitoring of policies such as usage and bandwidth. A cloud based security system may scan and record hundreds of millions of transactions in a given 24 hour period. Such a large number of transactions would be very difficult to thoroughly inspect for cybercrime related activities on a real-time basis.

II. SUMMARY

The present application discloses methods, systems, and computer program products for supporting detection, notification, and/or mitigation (potentially including blocking) of undesirable network transactions in a cloud based security system. In such methods, systems, and computer programs, a log of network transaction for a fixed prior time period is received. The log is filtered to remove lower potential risk transactions to generate a pool of suspect transactions. The suspect transactions are then given a suspicion score based upon a variety of indicator checks. More detailed content analysis is then performed on sites associated with those suspect transactions with a suspicion score meeting a specified suspicion threshold. The content analysis determines which sites host malicious content. Such identified sites may then be provided as feedback into the overall cloud security system. For example, exclusion rules can then be generated for sites determined to host malicious content. Such generated rules may then, in some implementations, be incorporated into real-time transaction processing.

The foregoing general description and the following detailed description are exemplary and explanatory only and do not restrict the claims directed to the invention. The accompanying drawings, which are incorporated in and constitute a part of this specification, illustrate one or more embodiments of the invention and together with the description, serve to explain the principles of the disclosed technology.

III. BRIEF DESCRIPTION OF THE DRAWINGS

Figure 1:
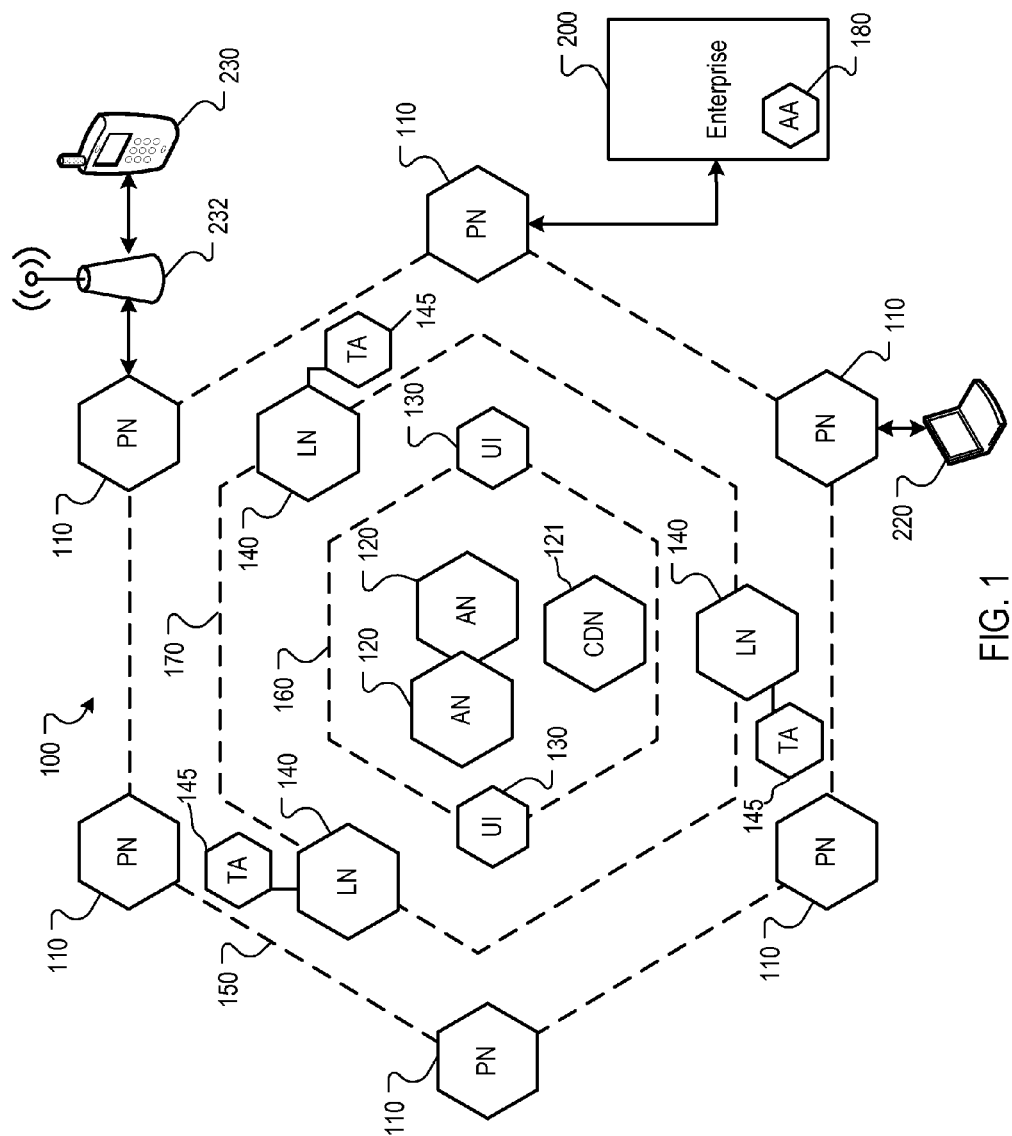
Figure 2:
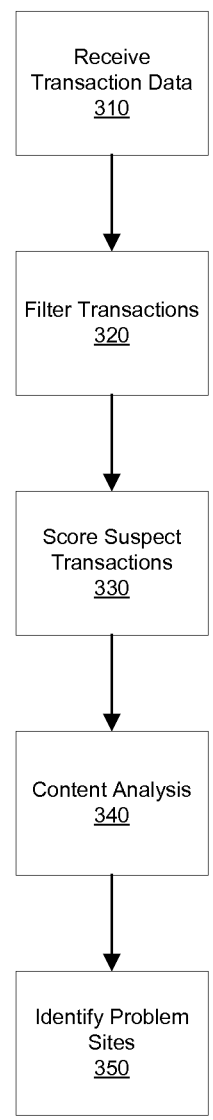

FIG. 1 is a block diagram of a cloud security system.
FIG. 2 is an exemplary process for performing analysis of network transaction data in order to identify sites for exclusion in subsequent processing of real-time transactions.

IV. DETAILED DESCRIPTION

This application refers in detail below to the exemplary embodiments of systems, methods and software that support exclusion of improper and/or undesirable network transactions, which are illustrated in the accompanying drawings. Wherever possible, the application uses the same reference numbers throughout the drawings to refer to the same or similar items.

Cloud based security (for example Zscaler® Security Cloud) is an emerging framework to deploy and upgrade security solutions for multiple service subscribers without causing the upgrade delay found in conventional premise security appliances and applications. Cloud based security is the common core of any cloud based service offering. Security services such as URL and content-based message filtering, malware scanning, and data leakage protection may be performed by the use of an access gateway. Additional specific services may be offered through appropriate configuration of policies available in the gateway.

In performing cloud based security, the system analyzes a substantial number of network transactions. These transactions form a minable base of information from which additional security problems and/or illicit activities may be identified. The volume of processed network transactions makes it difficult to perform such identification on a real-time basis. Logged transactions from a fixed past time period can be used to identify problematic sites and can serve as the basis for enhancing the cloud based security real-time transaction processing.

FIG. 1 is a block diagram of a cloud based security system 100. The system 100 can, for example, be implemented as an overlay network in a wide area network (WAN), such as the Internet. The system 100 includes content processing nodes 110 that detect and preclude the distribution of security and performance threats, e.g., malware, sent from or requested by an external system. Example external systems can include an enterprise 200, a computer device 220, and a mobile device 230, or other network and computing systems.

The term malware is used throughout the present disclosure to include any undesirable content that can pose a security risk or negatively impact the performance of a computing device, including, for instance, viruses, spyware, and spam.

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110. In other implementations, specific data specified by each external system, e.g., only e-mail, only executable files, etc., is process through a processing node 110.

Each processing node 110 can generate a decision vector $D=[d1, d2, \ldots, dn]$ for a content item of one or more parts $C=[c1, c2, \ldots, cm]$. Each decision vector can identify a threat classification, e.g., clean, spyware, malware, undesirable content, innocuous, unknown, etc. For example, the output of each element of the decision vector D can be based on the output of one or more data inspection engines. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

In some implementations, the actions taken by a processing node 110 can be determinative on the threat classification of the content item and on a security policy of the external system to which the content item is being sent from or from which the content item is being requested by. A content item is violating if, for any part C=[c1, c2, ..., cm] of the content item, at any processing node 110, any one of the data inspection engines generates an output that results in a classification of "violating."

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes described in more detail below.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines and dictionaries for the processing nodes.

The system 100 also includes a configuration distribution node (CDN) 121 that coordinates each of the processing nodes 110 and storage nodes 140. The CDN 121 can perform all of the functions of an authority node 120. According to some implementations, the CDN 121 can be an authority node 120. Thus, although illustrated as a separate component from the authority nodes 120, the CDN 121 may represent one such authority node 120. The CDN 121 can act as a master authority node by receiving data corresponding to system activity from each of the processing nodes 110 and storage nodes 140, which are each operable to forward the data to the CDN 121.

In some implementations thousands of system activities can be monitored at predefined intervals within each of the systems monitored by the processing nodes 110 and storage nodes 140. Data corresponding to at least some of the system activity is communicated from the processing nodes 110 and storage nodes 140 to the CDN 121. For instance, data corresponding to a few hundred system activities can be routinely communicated to the CDN. System activities can include operating system activity (e.g., disk I/O, File I/O, System Call), network events (e.g., packets received, packets sent, retransmissions, errors), and/or content inspection events (e.g., operation of anti-virus software, the occurrence or results of content inspection).

The CDN 121 receives data corresponding to system activity from multiple networks during normal operation of the cloud. The CDN 121 thus allows collection and monitoring of data from multiple, aggregated networks over a wide geographical distance. The cloud administrators can use this data to debug and determine cloud sub-system health. The CDN also allows for administrators to centrally manage rules and configuration for the cloud nodes and sub-systems. In some embodiments, the CDN 121 may receive feedback from transaction analysis (TA) node(s) 145. In some such embodiments, the TA feedback may include one or more rules (e.g., sites to block) for distribution or application to the process nodes (110).

Other application layer functions within the system 100 can be provided in the application layer, such as a user interface front-end 130, also referred to herein as view node. The user interface front-end 130 provides a user interface through which users of the external systems can provide and define security policies, e.g., whether e-mail traffic is to be monitored, whether certain web sites are to be precluded, etc.

Another application capability that can be provided through the user interface front-end 130 is security analysis and log reporting. The underlying data on which the security analysis and log reporting functions operate are stored in storage nodes 140, which serve as a data storage layer 170. Each storage node 140 can store data related to security operations and network traffic processed by the processing nodes 110 for each external system.

In some implementations, the storage node 140 data can be anonymized so that data identifying an enterprise is removed or obfuscated. For example, identifying data can be removed to provide an overall system summary of security processing for all enterprises and users without revealing the identity of any one account. In another example, identifying data can be obfuscated, e.g., provide a random account number each time it is accessed, so that an overall system summary of security processing for all enterprises and users can be broken out by accounts without revealing the identity of any one account. In other implementations, the identifying data and/or storage node 140 data can be further encrypted, e.g., so that only the enterprise (or user if a single user account) can have access to the storage node 140 data for its account. Other processes of anonymizing, obfuscating, or securing storage node 140 data can also be used.

In some implementations, storage node 140 may be connected to an transaction analysis (TA) node 145. Although depicted as multiple nodes, a single node may support transaction analysis and interact with storage nodes 140 to retrieve log data from each such storage node and/or use a further system that retrieves and aggregates log data from multiple nodes. The analysis nodes can perform the cybercrime analysis process discussed in more detail below. In some embodiments, the functionality of the transaction analysis node 145 may be subsumed into storage nodes 140. Alternatively, or redundantly, the transaction analysis functionality may be subsumed by CDN 121.

In some implementations, an access agent 180 can be included in the external systems. For example, an access agent 180 is deployed in the enterprise 200. The access agent 180 can, for example, facilitate security processing by providing a hash index of files on a client device to a processing node 110, or can facilitate authentication functions with a processing node 110, e.g., by assigning tokens for passwords and sending only the tokens to a processing node so that transmission of passwords beyond the network edge of the enterprise is minimized. Other functions and processes can also be facilitated by an access agent 180.

In some implementations, the processing node 110 may act as a forward proxy that receives user requests to external servers addressed directly to the processing node 110. In other implementations, the processing node 110 may access user requests that are passed through processing node 110 in the transparent mode. A protected system, e.g., enterprise 200, can, for example, choose one or both of these modes.

For example, a browser may be configured either manually or through an access agent 180 to access a processing node 110 in a forward proxy mode. In the forward proxy mode, all accesses are addressed to processing node 110.

In another example, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

In another example, the processing nodes 110 can be deployed at Internet service provider (ISP) nodes. The ISP nodes can redirect subject traffic to the processing nodes 110 in a transparent proxy mode. Protected systems, such as the enterprise 200, can use a multiprotocol label switching (MPLS) class of service for indicating the subject traffic that is to be redirected. For example, within the enterprise an access agent 180 can be configured to perform MPLS labeling.

In another transparent proxy mode example, a protected system, such as the enterprise 200, may identify a processing node 110 as a next hop router for communication with the external servers.

The CDN 121 coordinates each of the processing nodes 110, and storage nodes 140. As described above, according to an implementation, the CDN 121 can represent an authority node 120. Thus, the CDN 121 can perform all of the functions of an authority node 120 and can receive data corresponding to system activity from each of the processing nodes 110 and storage nodes 140. In some embodiments, the CDN 121 may receive feedback from transaction analysis node(s) 145. In some such embodiments, the feedback may include one or more rules for distribution or application by the cloud security system and/or include one or more identified network sites from which the CDN 121 may develop one or more rules for distribution and/or application.

The exemplary processes and/or procedures discussed below may be implemented in the cloud security system discussed above. These processes and/or procedures may further be stored on non-transitory computer readable media as one or more computer programs as discussed in greater detail below.

An exemplary transaction analysis procedure within 145 may include the following steps as depicted in FIG. 3. In step 310, a log of network transaction data is received for a fixed time period. This initial pool of network transaction records may include hundreds of million transactions. This initial pool of records is passed in step 320 through one or more filters to exclude transactions that are likely to be benign or have little initial indication of being suspicious. The remaining suspect transactions are scored by a series of indicator checks in step 330. In depth content analysis is performed on suspect transactions having a score meeting a specified threshold in step 340. Based on the content analysis, sites hosting malicious content or supporting cybercrime related activities are identified in step 350. The identified sites may then be provided back to the cloud security system's in-line processing for exclusion of subsequent transactions with the identified sites. A more detailed examination of these various steps follows.

Receipt of Network Transaction Log

As discussed above, storage nodes 140 store data related to transactions processed by the cloud security system. Transaction analysis node 145 receives data in the form of network transaction logs from the storage nodes 140. These logs represent transaction monitored by the cloud security system over a fixed period of time, for instance the previous 24 hours.

The receipt of the logs may involve a push or pull mechanism. Further, the analysis node 145 may represent a single system processing aggregate transaction logs from one or more storage nodes 140. Each analysis node 145 may connect to a subset of storage nodes 140, or each storage node 140 may have an associated analysis node. In addition, where the transaction analysis functionality resides on the same hardware platform as the storage node functionality, the receipt of the network transaction log may be interprocess communication, access to common primary or secondary storage, or similar known protocol.

Initial Filtering

Filtering of transaction is performed to remove transactions that are likely to be benign or not to be malicious. These filters may be modified and tweaked over time to removed transactions that are least likely to be related to cyber security/cyber crime threats. These initial filters may include the one or more of the following filters:

Filter out transactions with sites that the cloud security system has already identified and blocked for its customers. The transaction analysis need not re-analyze sites already identified as threats.

Filter out transactions to sites that have their site already categorized as safe. The analysis need not consider sites that the cloud security system has already seen and categorized based on safe content (e.g., Financial, News, etc. site).

Filter out transactions that do not have a positive response code (e.g., 200 HTTP response code).

Filter out transactions dealing with file types and content that are not likely to be malicious (for example, JPEG, GIF, PNG, CSS, ICO, audio, video, and streaming media). The file/content type may be gleaned from the file extension, inline file identification (e.g., identification of file type header), and from the HTTP header.

Filter out encrypted (SSL/TLS) transactions, as current and historical transaction logs indicate that few encrypted transactions contain malware or cyber security threats.

In some embodiments, these initial filters may be supplemented by one or more of the following filters based on history/reputation of the destination site:

Look up the autonomous system number (ASN) of the server IP address. If the ASN is in a white list based upon positive reputation (that is, organizations that rarely/never serve malicious content) then filter out the transaction. This white list may be built from both internal and external reputation data feeds.

In a similar manner to the organization/ASN reputation, the specific IP address may have a particular positive reputation. Trusted IP addresses are also filtered.

Filter out transactions involving regular expressions consistent with transaction that are likely to be benign sites (for example, webmail/OWA (Outlook Web Access) sites, portals, and software upgrade sites). If the destination URL matches one of the regular expressions, then filter out the transaction.

Lookup the domain associated with the network transaction. If the domain is in a white list based upon positive reputation, then filter out transactions to these domains. The domain reputation may be determined from both internal and external reputation data.

Suspicion Scoring

Upon completion of the filtering process, the pool of web transactions may be further narrowed down (for example, to hundreds of thousands to a few million transactions). However, in environments like the Zscaler® Security Cloud, there may still remain a large number of transactions to scrutinize. With this volume of transactions it is possible to do some high-level, superficial checks for suspicious indicators of the transaction. These checks will be described in greater detail, but typically involve inspecting the transaction meta-data for specific indicators of suspiciousness. One or more of the following types of indicator checks may be included in the aggregate suspicion scoring:

Transaction Information Checks

This indicator type analyzes and makes a determination based on information about the data/meta-data of the network transaction. For example, the type of server response code, type of user-agent, time of transaction, or MIME type. Some more specific examples of this kind of check may include:

Non Standard Port Usage—This is web traffic that is not over standard web ports (e.g., 80/TCP or 443/TCP). A number of past and current threats have leveraged non-standard port usage on web servers. For example, the Gumblar worm was served from port 8080/TCP, IRC bots frequent port 6667/TCP, and some backdoor trojans have used 53/TCP. Compromised webservers are sometimes configured to serve their malicious content from a different port than the benign content on the server to hide the activity from the webmaster.

Unknown User Agent—Infected hosts/bots may use user-agent strings that differ from standard, user-driven browsers such as Internet Explorer or Firefox. This check identifies use of unknown user agents for transactions.

After Hours Transaction—This check identifies transactions between 10 PM-5 AM local time for the client IP country of origin.

Listing Checks

This indicator type checks against any number of lists (e.g., white and black lists) containing any number of comparisons (e.g., IP, domain, path, regular expression). For example, specific checks of this kind may include:

Suspicious ASN—Determine if the ASN associated with the transaction is on a black list of suspicious ASNs/organizations.

Suspicious Regular Expression—Lists of regular expression may identify suspicious URLs (such as fake anti-virus, fake codec, some botnet command-and-control servers, malicious filenames, etc.).

Suspicious IPs—If the server IP has been identified in a botnet in recent blocklists (for example, dnsbl.abuse.ch/fast-fluxtracker.php), this server IP is considered suspicious.

Suspicious countries of origin—For example, doing a GeoIP lookup on the server IP may reveal a transaction involving a country that is known to be riskier than those from countries that have more trust-worthy content/better abuse handling policies. This list of countries and corresponding risk score may be maintained and updated over time.

Similarly, suspicious top-level domains (TLDs) are considered to contain riskier content than those that typically contain benign content. This list of TLDs and corresponding risk score is maintained and updated over time.

Trusted Datafeeds—This is a block list check of the destination to see if the destination has been listed by a trusted datafeed. Current exemplary trusted datafeeds may include SURBL, Zeus Tracker, and Malware Domains List. Additions and subtractions to this list of trusted datafeeds may occur over time.

Site history checks—This indicator type checks against the past history of the IP, domain, URL path (reputation, is it new, has it been blocked, etc.). For example, specific checks of this kind may include:

Previous Domain—Transactions to domains that the cloud security system has not seen in a given prior time period (e.g., the last N days, 1 week, etc.) may be considered more suspicious.

Suspicious Domain—If the cloud security system blocked a transaction to a domain for malicious purposes in a given prior time period (e.g., the last N days, 1 week, etc.), this domain is considered as suspicious.

Suspicious IP—If the cloud security system blocked a transaction to a server IP for malicious purposes in a given prior time period (e.g., the last N days, 1 week, etc.), this server IP is considered as suspicious.

Suspicious Path—If the cloud security system blocked a transaction to a URL path for malicious purposes in a given prior time period (e.g., the last N days, 1 week, etc.), this path is considered as suspicious. A whitelist may be used to exclude "common" webpages (e.g., index.html).

Requester History Checks

This indicator type checks against the past of the client and user (reputation, infected or risky behavior). For example, specific checks of this kind may include:

Risky User—The cloud security system logs the User ID associated with each transaction. Transactions from a User ID that has had a transactions blocked within a particular time frame because of malicious reasons is deemed to be a "riskier" user. Transactions from these users are identified.

Unknown/Unauthorized User—The cloud security system may allow some network transactions in which no user is authenticated so that non-user driven, application, transactions are not blocked. However, unknown or unauthorized user transactions in this pool are considered to be more suspicious.

URL Character Usage Checks

This indicator type checks the characters used in the URL domain and path (e.g., "Scrabble" score). For example, Domain Scrabble—Cybercrime campaigns typically include an infrastructure piece in which domains are automatically and bulk registered for the purpose of being used within the crime. Often these domains are nonsensical character sequences. The board game "Scrabble" is based on getting the highest score from building real words based on less frequently used characters—often these nonsensical character sequences used in these bulk registered domains will have a much higher "Scrabble" score than a domain based on the English language.

Path Scrabble—Similar to the domain scrabble check, this analyzes the URL path.

Domain Meta-Data Checks

This indicator type check information about the domain (fast-flux A records, suspicious NS IP, self-resolving, etc.). For example, specific checks of this kind may include:

Self-Resolving Domains—As previously stated, cybercrime campaigns typically have their own infrastructure for supporting their malicious domain infrastructure. Often times the cybercrime domains registered resolve (A record) to an IP address that is also the IP address providing the name service (NS record) for that domain. Whereas, most of the Internet has the name services provided on a different server/IP, often through a third party.

Fast-Flux Domains—Fast-flux is a technique cyber criminals use to lessen the threat of having a hosting provider remove their content. The domain is set up to have a number of A records (called a round-robin) with short time-to-live (TTLs), so that the IP address of the server for a domain changes rapidly. Often the server IPs used are compromised hosts participating in a botnet and proxying the HTTP queries to a central, home server. Identifying domains that have four or more A records across IPs belonging to four or more different organizations with a TTL of 3600 or less may identify fast-flux domains.

Ratio Checks

This indicator type checks things like high/low web server count per ASN, and high/low page count per site. For example, specific checks of this kind may include:

Page Count—Cybercrime sites built for the specific purposes of infecting other hosts (e.g., serving an exploit kit) usually only serve a few pages on the site for conducting the social engineering, exploit, and serving the payload. Most other sites are rich in media and contain a number of files including pictures. In a preferred embodiment, sites with five or fewer pages are considered to be suspicious.

ASN Ratio—Organizations that provide web hosting services typically have a number of IPs within their autonomous system that are used for hosting web content. A way of finding organizations that do not usually host web content is to look for the number of web servers accessed per autonomous system. Hosting providers will have a larger ratio, than organizations that do not host content—this will help to find compromised servers that are being used to host malware from that organization. A preferred implementation identifies transactions to ASNs as suspicious where the cloud security system sees one domain present and less than 20 web pages.

Site Pages Check

This indicator type check things like sites without graphics, CSS, or other expected website files. For example, specific checks of this kind may include:

Lack of Media Files—Cybercrime sites built for the specific purposes of infecting other hosts (e.g., serving an exploit kit) usually only serve a few pages on the site for conducting the social engineering, exploit, and serving the payload. Most other sites are rich in media and contain a number of files including pictures. Sites that lack a threshold number of picture files may be considered suspicious.

Modeling Checks

This indicator type checks if the transactional information fits a model (e.g., beaconing, epidemic, clustering, etc.). For example, specific checks of this kind may include:

Epidemic Detection—This check seeks to identify an exponential increase of client IPs and/or user IDs accessing a site from the average accesses during a prior time period (e.g., the past week).

Beaconing Detection—This check seeks to identify a time-based difference cluster of transactions per client IP or user Id.

The indicator check types listed above are not mutually exclusive. The association of exemplary specific indicator checks with the indicator check types listed above is not intended to be exclusive. Consequently, specific indicator checks described above may also fall within one or more other listed type where the type definition provided above would support such an additional placement. For example, checks that score web transactions to domains that have had pages blocked due to a security reason could be categorized as a site history check but it could also be categorized as a list check since a listing of domains from past blocks is generated and checked against.

After the pipeline of indicator checks is run on the network transactions an aggregate score is calculated based on the results of all checks included. According to one approach, each positive hit on a check increases the suspicion score by a set value, such as one (1) in a particular implementation. Each check may generate a large volume of false-positives, so each check only increases the score of a transaction by a value corresponding to the likelihood that the check identified a suspicious/malicious transaction. The aggregation of multiple checks, therefore, may provide a strong indicator of suspicious transactions. In a preferred embodiment, the various specific indicator checks discussed above are all included; however, a smaller selection of checks may be used in alternative embodiments.

In some embodiments, particular checks of known greater reliability may be more heavily weighted. Trusted datafeed checks may provide greater reliability, and therefore, may have an increased weight in the scoring. For instance, in a preferred embodiment, a trusted datafeed check may increase the suspicion score by four rather than one. Similarly, a suspicious IP or a suspicious regular expression may, in a preferred implementation, increase the suspicion score by two rather than one.

One or more of the indicator checks may preferably not performed in real-time as transactions are processed by the cloud based security system. However, in some implementations, one or more of the indicator checks may be performed in real-time. In some such implementations, the result of indicator checks performed in real-time may be stored in the transaction log, and such stored results may be used in the scoring process in combination with results of indicator checks performed offline.

Once scoring is complete, suspicious transaction having an aggregate suspicion score above a selected threshold are identified for content analysis. While the threshold score may be tweaked and maintained to provide a list of transactions with the highest probability of being malicious, the threshold score may be set to eight, in one preferred embodiment. Through this process, the set of network transactions for content analysis has been winnowed to a more computationally manageable level.

Content Analysis

Network transactions having a suspicion score over the selected threshold have their URLs fed to one or more content inspection engines to inspect the actual content of the site. The site may be subjected to multiple commonly available anti-virus engines, sandboxes, inspection/deobfuscation tools, and third party sources to analyze and inspect the content for these suspicious sites.

The content inspection engines may consist of a variety of third party engines as well as one or more custom content checks. Examples of $3^{rd}$ party content inspection engines are: anti-virus engines (Kaspersky, Sophos, Panda, and McAfee), sandboxes (Qualys, Anubis, Wepawet), and JavaScript deobfuscation and analysis engines (JSunpack). Custom content analysis methodologies may also preferably be employed to quickly identify suspicious/malicious content. For example, identification of content added to a website that appears to be malicious (e.g., iframe following closing HTML tag), JavaScript density (tightly packed JS often indicates obfuscation), and using distance formulas (Levenshtein distance) to identify how similar a page is to other known malicious pages.

Feedback to the In-Line Transaction Processing

If the content of the site is determined to be malicious then the URL and/or network site information is fed into the cloud security system's in-line inspection system to protect customers from future transactions to these malicious pages. Feedback from the offline analysis can be automatically provided into production by pushing information about the suspicious transactions (server IP, domain, and URL) to the CDN. The CDN may in one preferred embodiment then populate the policy enforcement nodes with rules to block transactions or assign a higher web risk index (WRI) score to future similar transactions.

In some preferred embodiments, the WRI is a score given to every web transaction going through the cloud. In one implementation, the score is 0-100, where 0 is the lowest risk and 100 is the highest risk (and is blocked). The cloud security provider may allow a default risk score threshold for which pages of this risk or higher are blocked. This threshold setting may be exposed to the end customer for them to modify based on their own risk avoidance/acceptance. Things like web server IP reputation, country, and the transaction analysis (TA) report for a website may contribute to the WRI score.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a non-transitory computer readable medium. The computer readable medium can be a machine readable storage device, a machine readable storage substrate, a memory device (volatile or non volatile), or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of volatile or non volatile memory, media and memory devices, including by way of example semiconductor memory devices, e.g., EPROM, EEPROM, RAM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. Other embodiments of the invention will be apparent to those skilled in the art from their consideration of the specification and practice of the invention disclosed in this document. The applicant intends that the specification and examples be considered as exemplary only, with the true scope and spirit of the invention being indicated by the following claims.

What is claimed is:

1. A computerized method performed by a transaction analysis system for identifying sites for transaction exclusion by a cloud security system, the method, comprising:
   A) receiving a log of real-time network transactions processed by the cloud security system over a fixed period of time;
   B) applying a plurality of filters that exclude transactions that are benign or have little indication of being suspicious from the network transactions in the log to generate a pool of suspect network transactions by removing the excluded transactions;
   C) generating a suspicion score for a selected network transaction from the pool of suspect network transaction based upon a plurality of indicator checks; and
   D) if the suspicion score for the selected network transaction meets a specified threshold, performing content analysis on a network site associated with the selected network transaction to determine if the network site hosts malicious content, and if the network site is determined to host malicious content, adding information to the cloud security system that blocks subsequent real-time network transactions involving the network site;
   wherein steps A)-C) are performed offline to enhance real-time transaction processing by the cloud security system.

2. The method of claim 1, wherein the plurality of filters comprises exclusion of transactions with sites that the cloud security system already has already classified.

3. The method of claim 1, wherein the plurality of indicator checks comprises one or more transaction information checks, one or more listing checks, one or more site history checks, one or more requester history checks, one or more URL character usage checks, one or more domain meta-data checks, one or more ratio checks, one or more site page checks, and one or more modeling checks.

4. The method of claim 1, wherein the plurality of indicator checks comprises a trusted datafeed-check.

5. The method of claim 4, wherein passing the trusted datafeed check contributes a greater amount to the suspicion score than other indicator checks.

6. The method of claim 1, and further comprising the step of transmitting to an administrator a notification of malicious content in connection with the network site if the network site is determined to host malicious content.

7. The method of claim 1, wherein steps C and D are repeated for each network transaction in the pool of suspect transactions.

8. The method of claim 1, wherein the log of real-time network transactions is received from one or more storage nodes in the cloud security system, and wherein the log of real-time network transactions comprises transactions already monitored by the cloud security system.

9. The method of claim 1, wherein the plurality of filters that exclude the transactions that are benign or have little indication of being suspicious comprise:
   transactions that the cloud security system have already identified and blocked;
   transactions that the cloud security system have already identified as safe;
   transactions that do not have a positive response code;
   transactions with file types and content comprising audio and/or video media files; and
   transactions that are encrypted.

10. The method of claim 9, wherein the plurality of filters that exclude the transactions that are benign or have little indication of being suspicious comprise:
    using reputation based on IP address;
    transactions comprising webmail, portals, or software upgrade sites; and
    using reputation based on domain name.

11. The method of claim 1, wherein the plurality of indicator checks for generating the suspicion score comprise:
    non-standard port usage;
    unknown user agent strings;
    after hours transaction based on client IP country of origin;
    listing checks;
    site history checks;
    requester history checks; and
    URL character usage checks.

12. One or more non-transitory media storing instructions that upon execution by a computer cause the computer to identify sites for transaction exclusion by a cloud security system by performing the steps comprising:

A) receiving a log of real-time network transactions processed by the cloud security system over a fixed period of time;

B) applying a plurality of filters that exclude transactions that are benign or have little indication of being suspicious from the network transactions in the log to generate a pool of suspect network transactions by removing the excluded transactions;

C) generating a suspicion score for a selected network transaction from the pool of suspect network transaction based upon a plurality of indicator checks, wherein the plurality of indicator checks comprises one or more transaction information checks, one or more listing checks, one or more site history checks, one or more requester history checks, one or more URL character usage checks, one or more domain meta-data checks, one or more ratio checks, one or more site page checks, and one or more modeling checks; and D) if the suspicion score for the selected network transaction meets a specified threshold, performing content analysis on a network site associated with the selected network transaction to determine if the network site hosts malicious content, and if the network site is determined to host malicious content, adding information to the cloud security system that that blocks subsequent real-time network transactions involving the network site;

wherein steps A)-C) are performed offline to enhance real-time transaction processing by the cloud security system.

13. A transaction analysis system that identifies sites for transaction exclusion by a cloud security system, the system comprising:

A) a data store capable of storing:
  i) a log of real-time network transactions;
  ii) transaction filtering information; and
  iii) transaction suspicion scoring information;

B) a system processor comprising one or more processing elements, the system processor in communication with the data store and programmed or adapted to perform steps comprising of:
  i) receiving a log of real-time network transactions processed by the cloud security system over a fixed period of time;
  ii) applying a plurality of filters that exclude transactions that are benign or have little indication of being suspicious from the network transactions in the log to generate a pool of suspect network transactions by removing the excluded transactions;
  iii) generating a suspicion score for a selected network transaction from the pool of suspect network transaction based upon a plurality of indicator checks, wherein the plurality of indicator checks comprises one or more transaction information checks, one or more listing checks, one or more site history checks, one or more requester history checks, one or more URL character usage checks, one or more domain meta-data checks, one or more ratio checks, one or more site page checks, and one or more modeling checks; and
  iv) if the suspicion score for the selected network transaction meets specified threshold, performing content analysis on a network site associated with the selected network transaction to determine if the network site hosts malicious content, and if the network site is determined to host malicious content, adding information to the cloud security system that that blocks subsequent real-time network transactions involving the network site;

wherein steps i)-iii) are performed offline to enhance real-time transaction processing by the cloud security system.

\* \* \* \* \*